US010448477B2

(12) United States Patent
Bogart

(10) Patent No.: US 10,448,477 B2
(45) Date of Patent: Oct. 15, 2019

(54) ADJUSTABLE LIGHTING SYSTEM

(71) Applicant: Mitchell J. Bogart, Sharon, MA (US)

(72) Inventor: Mitchell J. Bogart, Sharon, MA (US)

(*) Notice: Subject to any disclaimer, the term of this patent is extended or adjusted under 35 U.S.C. 154(b) by 0 days.

(21) Appl. No.: 15/866,244

(22) Filed: Jan. 9, 2018

(65) Prior Publication Data

US 2019/0082510 A1 Mar. 14, 2019

Related U.S. Application Data

(60) Provisional application No. 62/449,197, filed on Jan. 23, 2017.

(51) Int. Cl.
F21K 9/232 (2016.01)
H05B 33/08 (2006.01)
G05F 1/10 (2006.01)
G05F 1/625 (2006.01)
G05F 1/66 (2006.01)

(52) U.S. Cl.
CPC ......... H05B 33/0857 (2013.01); F21K 9/232 (2016.08); G05F 1/10 (2013.01); G05F 1/625 (2013.01); G05F 1/66 (2013.01); H05B 33/0845 (2013.01); H05B 33/0863 (2013.01); Y02B 20/343 (2013.01); Y02B 20/346 (2013.01)

(58) Field of Classification Search
CPC .. H05B 33/0857; H05B 33/0845; F21K 9/232
See application file for complete search history.

(56) References Cited

U.S. PATENT DOCUMENTS

| 6,181,538 | B1* | 1/2001 | Yoo | F25B 49/025 361/22 |
| 8,436,549 | B2 | 5/2013 | Hasnain | |
| 8,686,663 | B2* | 4/2014 | Ishikita | H05B 37/0272 315/294 |
| 9,801,250 | B1 | 10/2017 | Halliwell | |
| 2010/0231135 | A1* | 9/2010 | Hum | H05B 33/0815 315/250 |
| 2011/0115407 | A1 | 5/2011 | Wibben et al. | |
| 2011/0291585 | A1 | 12/2011 | Foo | |
| 2012/0133342 | A1* | 5/2012 | Murata | H02P 3/18 322/21 |
| 2016/0286613 | A1* | 9/2016 | Bayat | H05B 33/0818 |

OTHER PUBLICATIONS

Officer: Shane Thomas, International Search Report and the Written Opinion, International Patent Application PCT/US2018/014893, dated Apr. 23, 2018, 7 pp.

* cited by examiner

Primary Examiner — Ali Alavi
(74) Attorney, Agent, or Firm — Israel Nissenbaum; Yitzy Nissenbaum

(57) ABSTRACT

A light bulb or fixture design is presented which provides adjustability of color temperature, adjustability of brightness, and multiple location remote control in a scalable way that is thus ideal for retrofit installations, not requiring any rewiring, installation, or setup, other than insertion of light bulbs. Rather than using any Wifi, hand held remotes, or other RF communication links, operation is controlled using only the switch or switches that are part of the existing wiring. Operation is intuitive. It allows for unified dimming and/or color temperature control of extremely large numbers of bulbs of the invention without regard for heat dissipation limitations at the physical locations of control.

17 Claims, 11 Drawing Sheets

State 1 is the initial state on power-up after a non-brief period of no power

ADJUSTABLE LIGHTING SYSTEM

CROSS-REFERENCE TO RELATED APPLICATIONS

This application claims the benefit of U.S. Provisional Patent Application No. 62/449,197 filed Jan. 23, 2017, the entire contents of which are incorporated by reference herein.

BACKGROUND OF THE INVENTION

The present invention relates to an upgraded form of light control for the configurations of one or more light bulbs, alone or in a fixture, lamp, wall or ceiling, with power controlled by one or more switches. It is common for a consumer to desire to change the emission of light in one way or another. The existing ways of accomplishing this each have significant limitations. For example, to change brightness, either a 3-way bulb or a light dimmer may be used. The 3-way bulb approach requires a special fixture with a 3-way light bulb socket. Adjustment of 3-way bulbs is only via the physical switch right at the lamp socket thus providing only single local point of activation rather than remote control. Electronic dimmers are widely available and provide a remote point of control. These dimmers are an additional purchase and require installation, with which many consumers are not capable or comfortable, and which must be done properly for reasons of both safety and proper operation. Another desirable change is to alter the color temperature of the light. Currently this is generally done by replacing the light bulb with a different one, either Warm white or Cool white, according to the consumer's preference. Specialty adjustable color temperature bulbs are becoming more available and generally offer fully adjustable color lower power output for the bulb size. They almost all use a hand-held RF (radio frequency) remote control, though for some it is possible to install a special hard-wired control. These remote controls require a tech savvy consumer to setup and link the operation of multiple bulbs together, as each has its own radio channel or code. An additional limitation is there are now at least two places to control the light, the existing light switch and the new RF remote, which the user must furthermore take care not to misplace. Use of hard-wired light dimmers presents an additional limitation when it is desired to control very large numbers of light bulbs in unison. A large living room, recreation room, conference room, or auditorium may require many bulbs, perhaps as many as 10 to 100 or more for some institutions. A light dimmer has limited capacity, typically 300 watts, usually 500 watts at most. Even for very efficient light bulbs this capacity would be exceeded. Furthermore, such dimmers provide dimming control at one switch location only. Other switch locations, connected using 3-way or 4-way wiring for those same lights, will not have any dimming control. New types of digital Wifi solutions are also available, such as Insteon or GE Wink hubs. These do provide multiple location control and dimming—if one uses a smart phone or other additional device. Those systems also are definitely not for the high tech averse, of whom there are many. They are even not the choice of many gadget-loving people who simply desire regular, old-fashioned, reliable light switch control. It is the purpose of this invention to provide a solution in the form of a replacement light bulb or fixture with all the features of dimming, color temperature change, and very large numbered bulb installations, with virtually none of the above limitations.

SUMMARY OF THE INVENTION

It is thus a given that the typical consumer is comfortable with changing the light bulb, but not the switch. A light bulb of this invention contains all the innovation. It does not require a 3-way socket or special fixture. All control is performed using the switch. One advantage of this invention is that a bulb of the invention, a regular 2-terminal bulb, may be installed in either a 2-way or 3-way socket without compromising any functionality. Another advantage of the invention is that full control is provided at all of the two, three, or more switch locations for a given circuit, as long as those switches are able to turn lamp power Off and On, which, of course, is their primary and only function. A third advantage is that no changes of electrical wiring are needed. The same existing switches and wiring are used. Still another, and for some the major, advantage of the invention is that dimming and other adjustments are enabled for rooms with an extremely large number of bulbs. For new installations, where high efficient bulb use is ensured, very large numbers of bulbs may be variably controlled on a single circuit. Dimming is accomplished within the bulb of the invention. There is no central dimmer that must handle the aggregate heat dissipation. Still another advantage of the bulb of the invention is that it provides simple and intuitive variable color temperature control. These advantages are all enabled by something called "continuous wave modulation." The concept is simple and has been used literally for over a century in a variety of contexts. Continuous wave modulation, or "CW" as it is abbreviated, means sending a signal by multiple turnings of something On and Off, similar to how radio operators send messages using Morse code. The messages of this invention are sent by a momentary toggle of the light switch to off, once power has already been applied. One of the main advantages of CW is its extreme simplicity. No special modulators or transmitters are needed. Everything is accomplished with simple On/Off transitions. This invention uses the switches of an existing lighting circuit to send very brief "power line messages" as the described On or Off signals to the light bulbs of the invention installed in that circuit.

Many embodiments of the invention are possible including, but not limited to:

(1) A multiple color temperature light bulb containing both Warm White and Cool White light emitting elements wherein a click of the switch sequences among energized states of just Warm, just Cool, and Both types of light-emitting elements.

(2) A multiple brightness light bulb wherein a click of the switch sequences among energized states of different brightness where the dimming is accomplished with PWM (Pulse Width Modulation) generated internally in the bulb.

(3) A multiple brightness light bulb containing multiple internal light-emitting elements, such as many LED bulbs have, wherein a click of the switch will sequence among brightness states by energizing various numbers of its multiple internal light-emitting elements between all and one.

(4) A bulb with both adjustable brightness and adjustable color temperature, both of which are controlled and adjusted from multiple locations via switch flicks.

(5) A multiple function bulb incorporating a general purpose micro-controller to implement the methods of the invention for flexibility of design and cost saving.

BRIEF DESCRIPTION OF THE DRAWINGS

The following description of the invention will be further understood with reference to the accompanying drawings, in which.

DETAILED DESCRIPTION OF THE PREFERRED EMBODIMENTS

The embodiment described is for a light bulb of the invention having two LED light-emitting elements of different color temperature, Warm and Cool, selectable through successive Off-On cycling of the power. A second embodiment is shown, having both adjustable temperature and adjustable brightness, using an extension of the same control mechanisms of the invention.

Following the description of the hard-wired embodiment, the microcontroller based embodiment will be described separately, as its hardware and software are quite different though implementing the same functionality.

It should be said that since the focus of the invention is the control, a simple voltage source type LED driver is used in the example embodiment. Those skilled in the art may perhaps use other LED driver circuitry, such as constant current source, with multiple series LEDs, etc. as they see fit.

Figure 1:
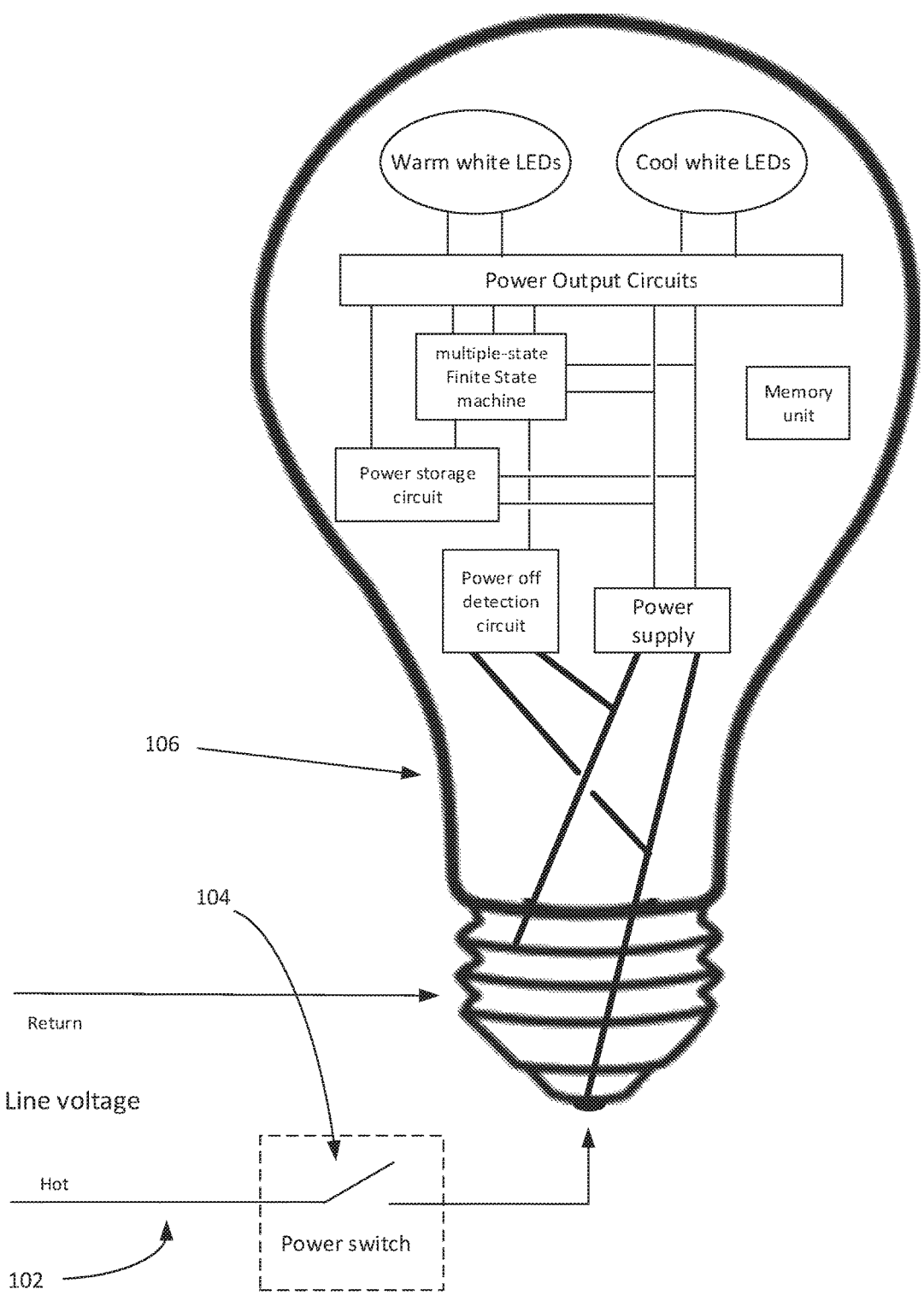
FIG. 1 shows a block diagram of a light bulb according to a first embodiment of the present invention with its internal components.

Referring to FIG. 1, line voltage power 102 passes through external power switch 104 and enters light bulb housing 106.

Power off detection circuitry 204 provides a digital electrical signal pulse (Low-High-Low), when the supplied line voltage, divided down to logic levels by resistive voltage divider 207 has toggled to off and back to on. Schmitt trigger 209 provides a cleaner, noise-free clock signal from this pulse.

The clock signal from Schmitt trigger 209 is connected to the clock inputs of digital flip-flops 210, 212, and 214, which together form a 3-state ring counter. The Q output of flip-flop 214 is connected to the D input of flip flop 210, ensuring that the current state of flip-flop 214 will be the next state of flip-flop 210 after a clock pulse.

Capacitor 215 of initialization circuit 204 is uncharged after a more-than-momentary period of power off. This presents Low logic levels to the Set, Clear, and Clear inputs of flip-flops 210, 212, and 214, respectively. Thus the initial states of the three flip-flops are High, Low, Low, respectively. In this state only Warm LED 216 is energized, through Darlington transistor 218. A detected off pulse from circuit 208 changes the counter to the next state, which is Low, High, Low. In this state only Cool LED 220 is energized, through Darlington transistor 222. Another detected off pulse changes to the next state, which is Low, Low, High. Logical OR gates 224 and 226 are connected such that transistors 218 and 222 are both turned on in this ring counter state, energizing both Warm and Cool LEDs 216 and 220. Since as mentioned the state of flip flop 210 follows the state of flip flop 214, the next state will be High-Low-Low, the same as the initial state, and the cycle repeats. The logical OR gates provide the function of mapping the individual cycled states to specific states of light illumination.

Power storage circuit 228 provides power for the digital electronics during brief power interruptions by means of circuitry containing capacitor 230.

Figure 3:
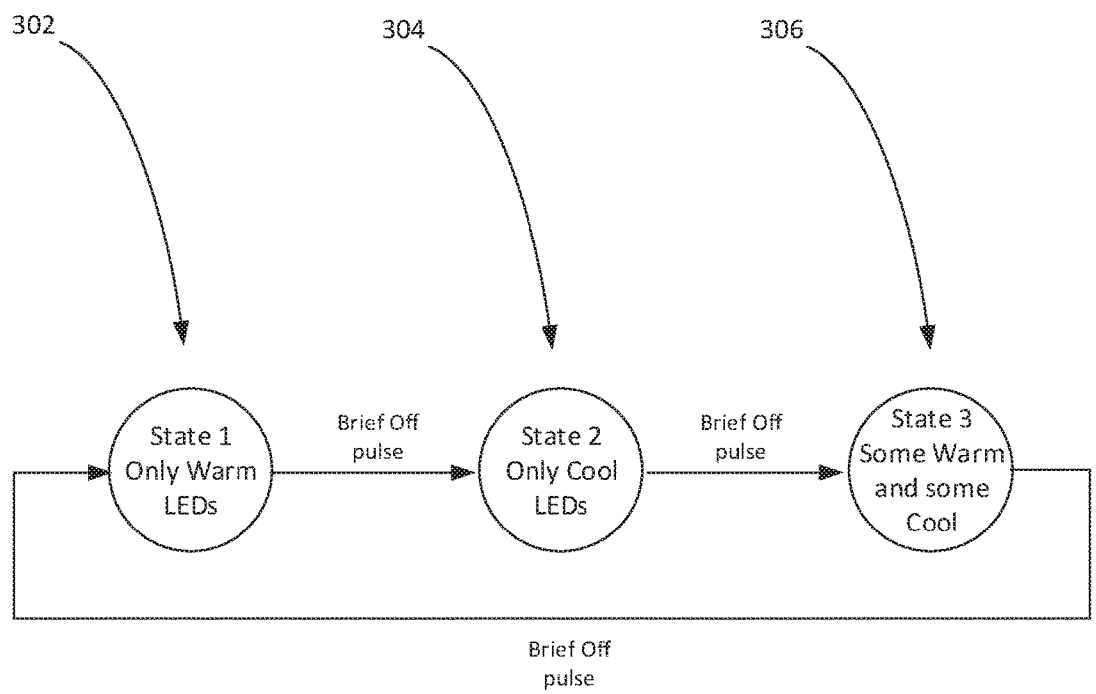
FIG. 3 shows a state diagram of the described embodiment bulb of the invention.

In this manner the light bulb of this invention may be used in any existing fixture, the color temperature will be Warm after initial activation. Referring to FIG. 3 a state diagram is shown with initial state 302. It will subsequently cycle through the state 304 of Cool, and then state 306 of Both. State 306 energizes both Cool and Warm LEDs and has a color temperature between Warm and Cool as perceived by human vision. Subsequent brief power off pulses cycle back to state 302, repeating the 3 state cycle. State changes are thus initiated from each and every switch controlling power to the light fixture in which this bulb is housed. Multiple instances of this bulb that are on the same power circuit and switch will operate in complete unison with each other. Additional switches at other locations, for example a 3-way switch or one or more 4-way switches, will all provide duplicate lighting control from their respective switch locations as those circuits provide On-Off control from each of the switches.

Figure 4:
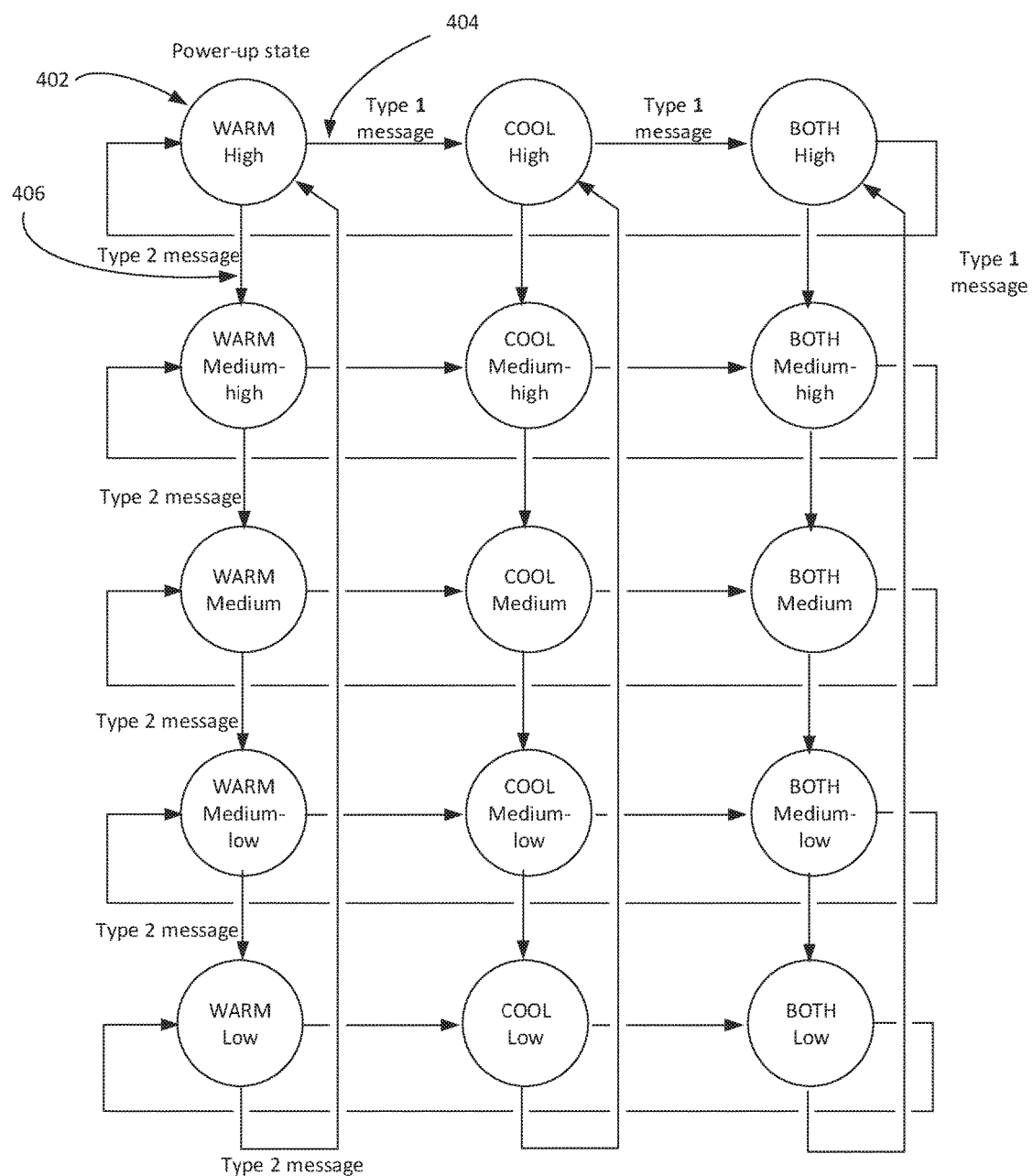
FIG. 4 shows a state diagram of an embodiment of the invention having 3 color temperatures and 5 brightness levels.

Referring to FIG. 4 a state diagram is shown for an alternate embodiment having 3 color temperatures and 5 brightness levels for each of the color temperatures, for a total of 15 states. For convenience the states are cycled in two directions, using two different recognized power cycle messages, the first cycles through 3 color temperatures and the second cycles brightness among the 5 levels of High, Medium-high, Medium, Medium-low, and Low. The controller initially comes up in state 402, by similar application of power-on presets to flip-flops as described. A type 1 message such as 404, a long power off pulse between 500 and 1000 milliseconds, will change the color temperature through states of COOL→BOTH→WARM in an endless cycle, one change per long pulse. A type 2 message such as 406, a short power off pulse between 100 and 500 milliseconds, will change the brightness through states of High, Medium-high, Medium, Medium-low, and LOW, in an endless cycle, one change per short pulse.

Figure 5:
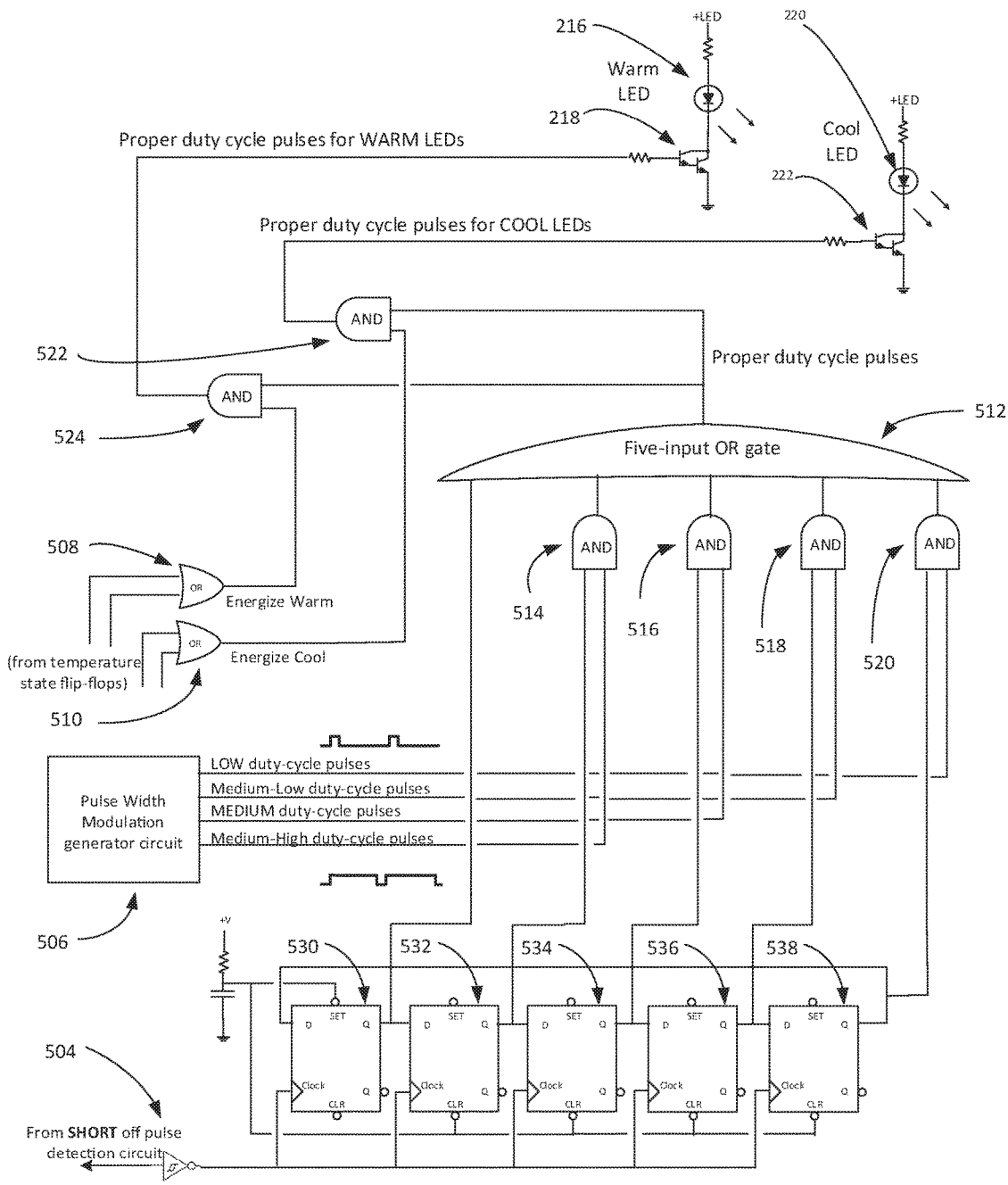
FIG. 5 shows a schematic diagram of the digital and analog circuitry of the embodiment having 3 color temperatures and 5 brightness levels.
Figure 6:
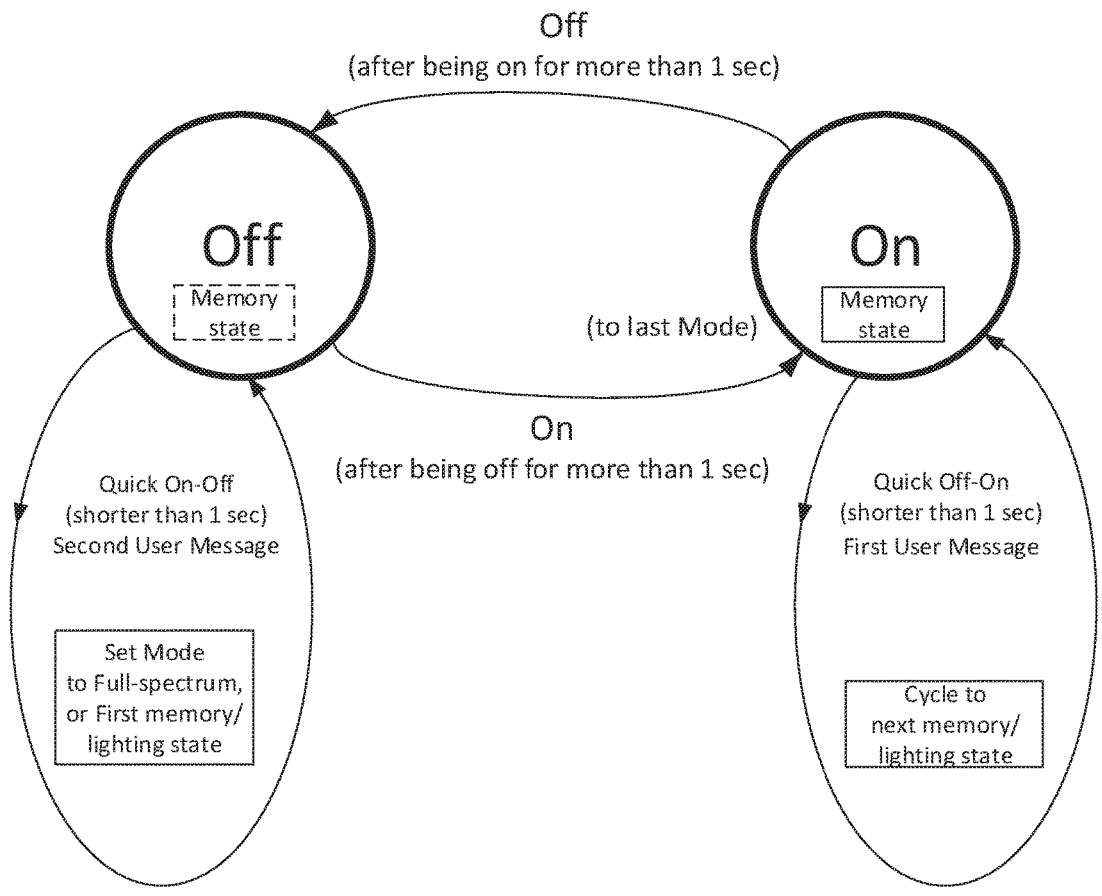
FIG. 6 is a diagram of the lighting memory state cycle of one embodiment of the present invention.
Figure 6:
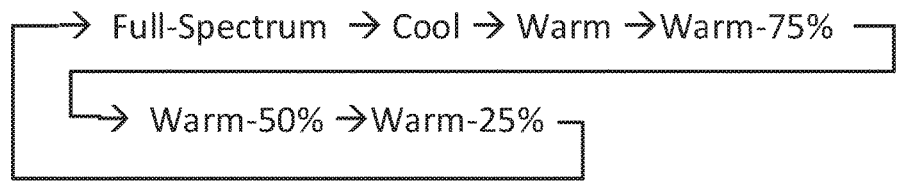
Figure 7:
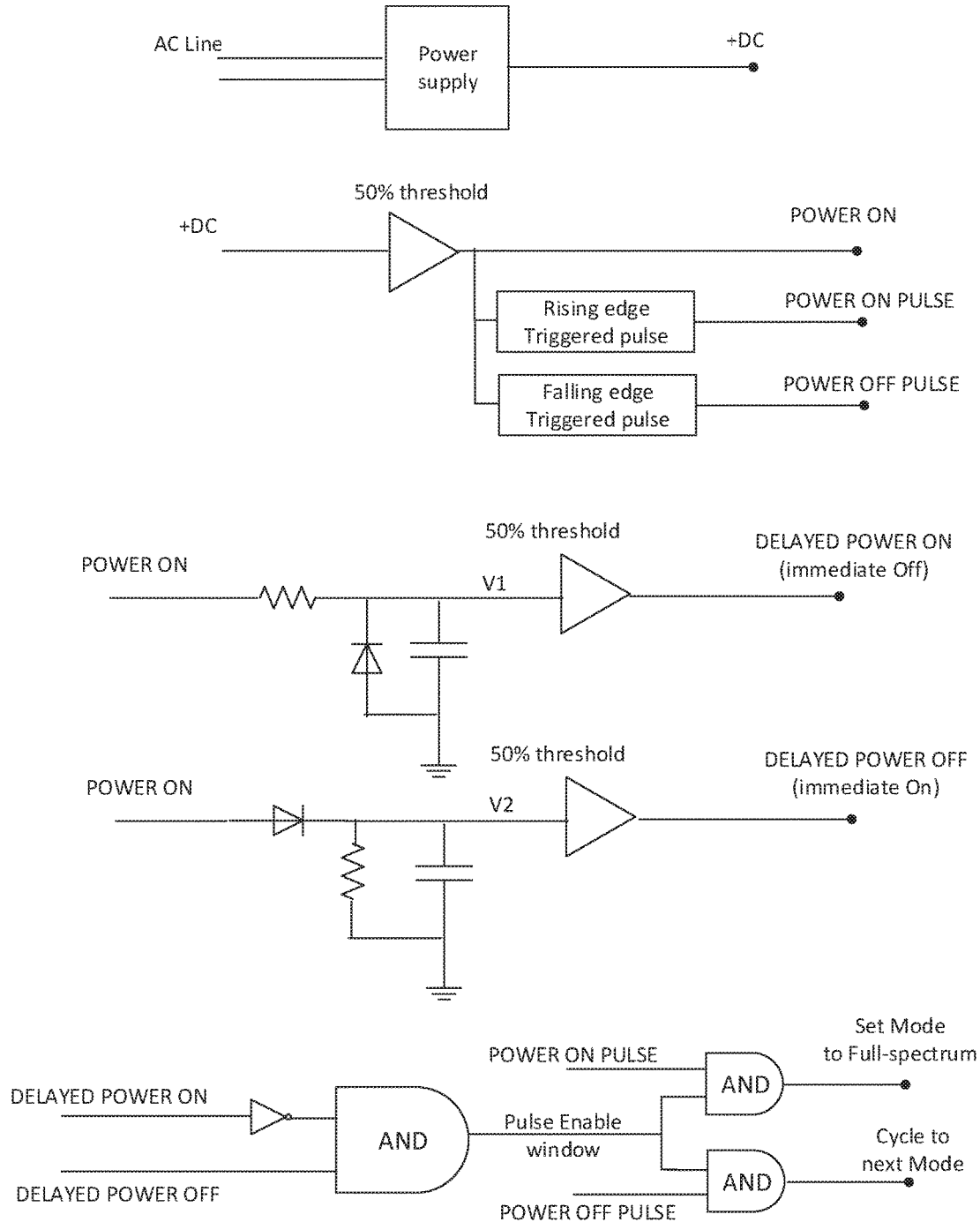
FIG. 7 is a timing diagram of an embodiment of the present invention.
Figure 8:
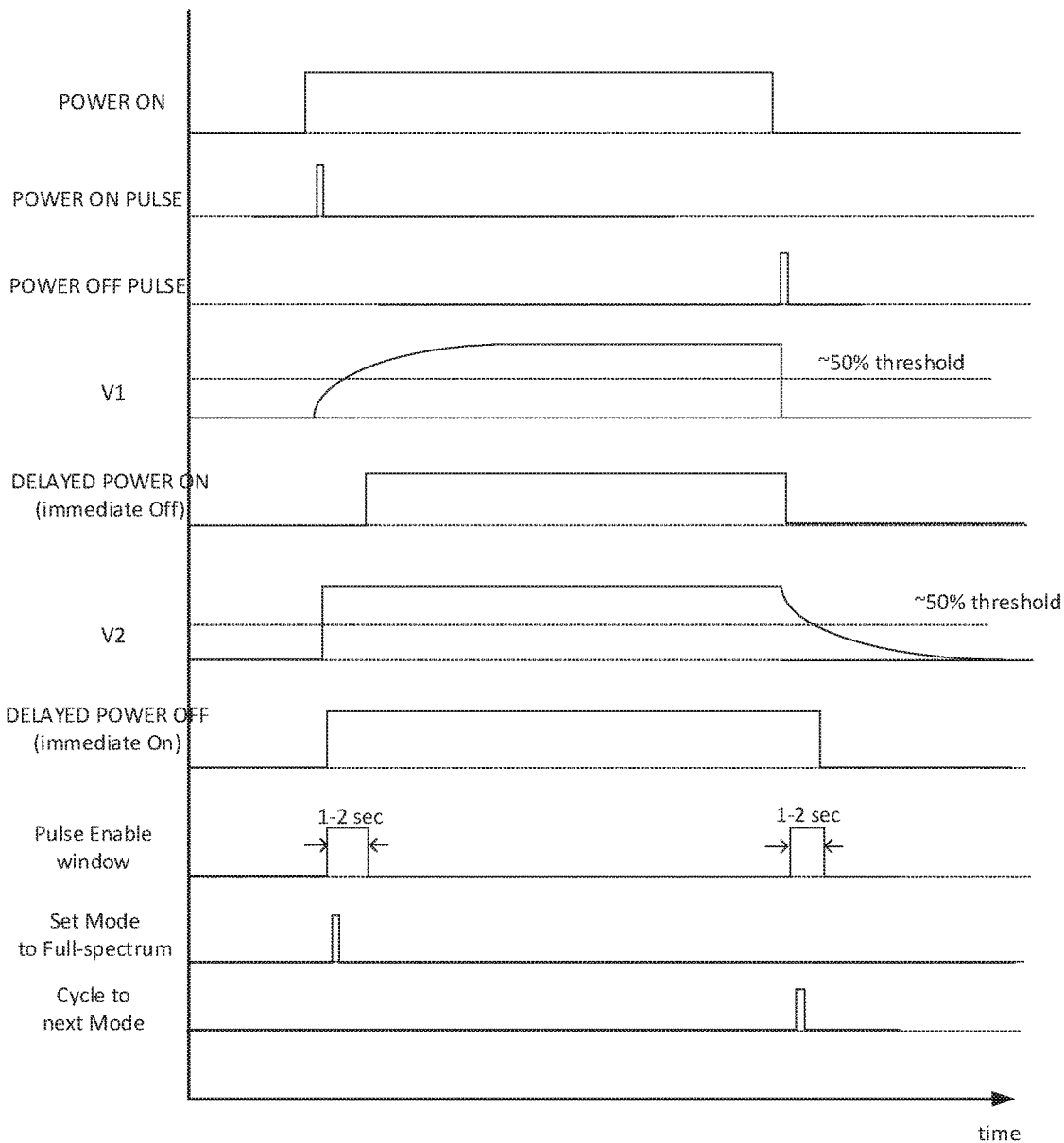
FIG. 8 is another timing diagram of an embodiment of the present invention.

Referring to FIG. 5, a schematic diagram of circuitry which implements the state diagram of FIG. 4 is shown. Five D flip-flops 530, 532, 534, 536, and 538 are configured as a 5-state ring counter, initialized to state 1-0-0-0-0. Detected short Off-On-Off pulses 504 are cleaned up by the Schmitt trigger and then connected to clock the ring counter through cycles of subsequent states 0-1-0-0-0, then 0-0-1-0-0, then 0-0-0-1-0, then 0-0-0-0-1, and then back to the initial state 1-0-0-0-0, repeating the cycle.

Further referring to FIG. 5, Pulse Width Modulation generator circuit 506 generates four PWM signals of duty-cycles Low, Medium-Low, Medium, and Medium-High, corresponding to states of brightness when that signal is used to energize an LED circuit with that duty cycles. These PWM signals are applied to one input of 2-input AND gates 514, 516, 518, and 520 respectively. The other inputs of these AND gates are connected to the outputs of flip-flops 532, 534, 536, and 538, respectively. These AND gets thus act like a digital switch, allowing the PWM input pulses to appear on the AND gate output if and only if the gates other, flip-flop-connected input is High. Since for the ring counter only one of the flip-flop outputs outputs is High at a time, only one of AND gates 514, 516, 518, and 520 is presenting pulses at a time. Five-input OR gate 512 combines these sources of pulses such that pulses on any one of its inputs are transferred to the output of OR gate 512. To effect full power, the output of flip-flop 530 is also connected to an input of OR gate 512. When the ring counter is in the first or initial state, 1-0-0-0-0, the output of OR gate 512 is held to a constant High, the equivalent of a 100% duty-cycle pulse.

Figure 2:
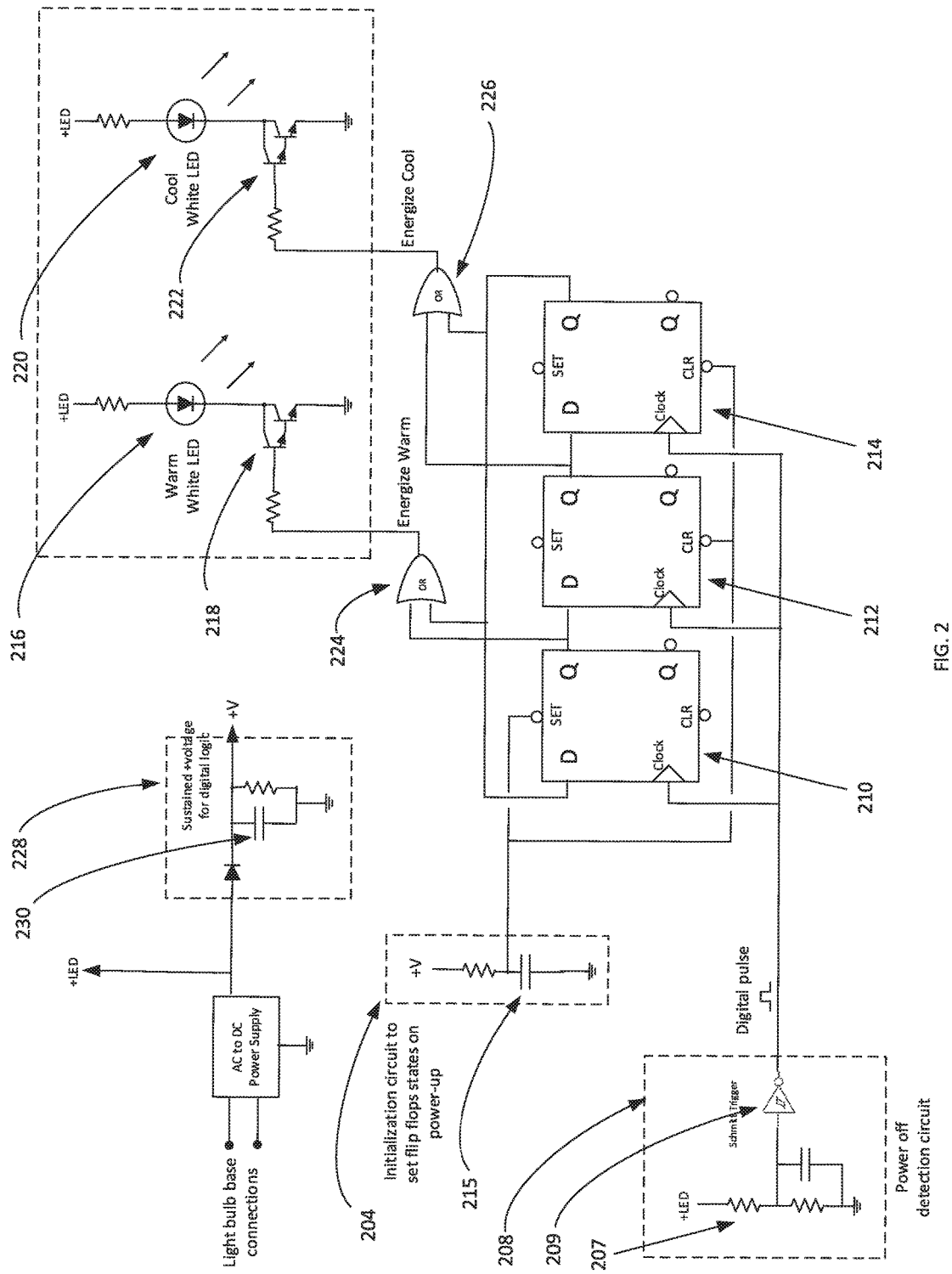
FIG. 2 shows a schematic diagram of the digital and analog circuitry of the described embodiment bulb of the invention.

Further referring to FIG. 5, the output of GATE 512, labeled "Proper duty-cycle pulses, are presented as one of the inputs to each of 2-input AND gates 522 and 524. The other input of gate 522 is connected to a logic level labeled "Energize Cool", produced in a similar manner to that described from OR gate 226 (FIG. 2). The other input of gate 524 is connected to a logic level labeled "Energize Warm", produced in a similar manner to that described from OR gate 224 (FIG. 2). In this manner the outputs of AND gates 522 and 524, connected to energize COOL and/or WARM LEDs 220 and 216, respectively, contain pulses of the duty-cycle corresponding to brightness, and presented the proper LEDS according to the selected color temperature state.

Compared to using a single light dimmer to control multiple bulbs, with each bulb generating its own PWM signal, effectively doing its own dimming, heat dissipation in the dimming circuitry is totally de-centralized, occurring at each bulb location rather than in the one or fewer switch box locations. An extreme but completely plausible example points out the benefit. An auditorium with 100 bright LED bulbs of the invention, consuming 13 watts each, and all on a single circuit, for an aggregate of 1300 watts of power consumption, with the rule-of-thumb 5-to-1 equivalent illumination of 6500 watts of incandescent bulbs, and a total current draw of less than 11 amps, may all be uniformly controlled in brightness and color temperature safely and easily from multiple switch locations on a standard 15 amp circuit. A single tap of any switch to off and back cycles all 100 bulbs to the next lower dimming level, while a single longer tap of any switch changes the color temperature from Cool to Both to Warm again.

<New, Microcontroller Implementation Hardware and Software Begins Here>

Figure 9:
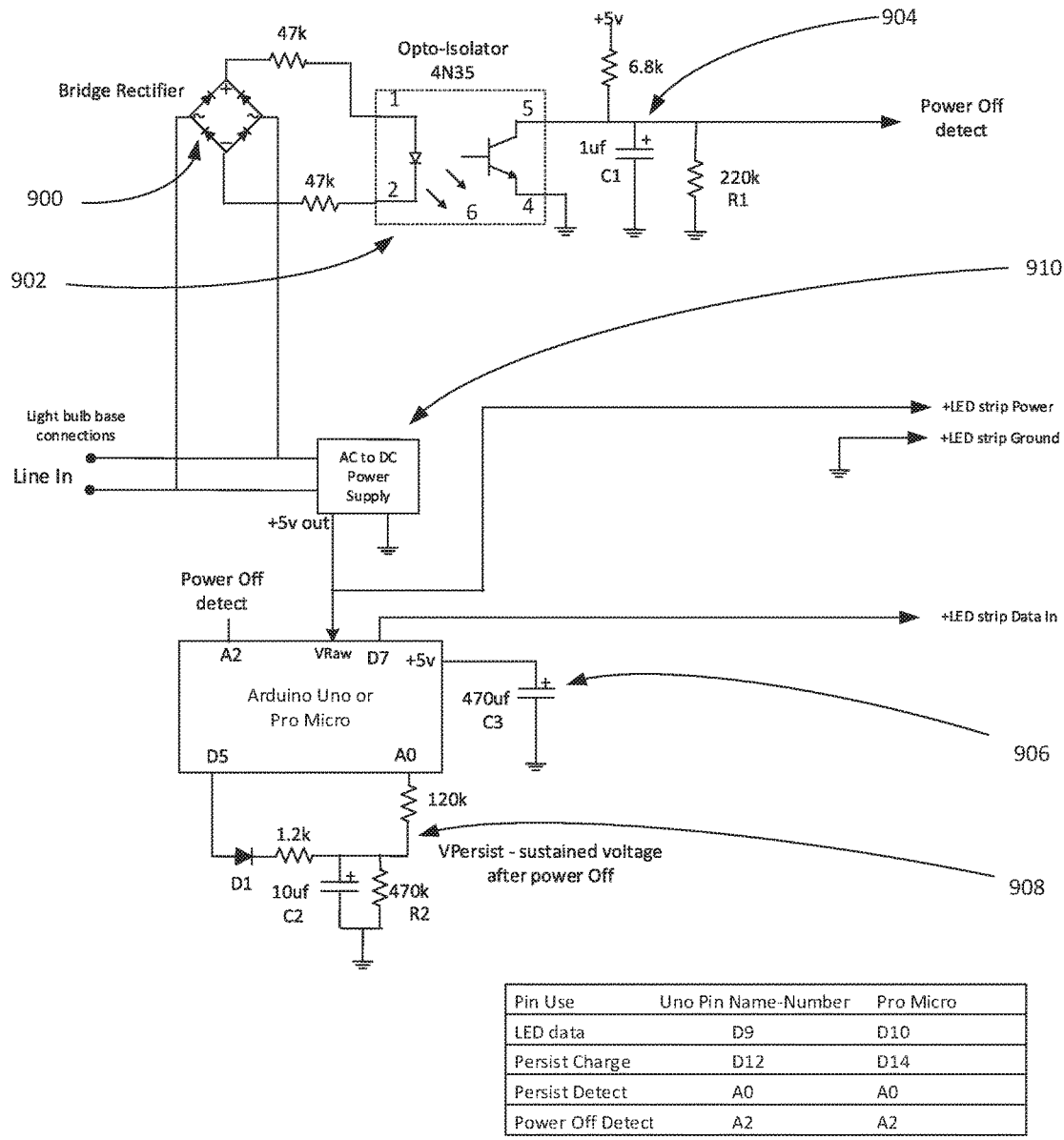
FIG. 9 shows a schematic diagram of the microcontroller embodiment.
Figure 10:
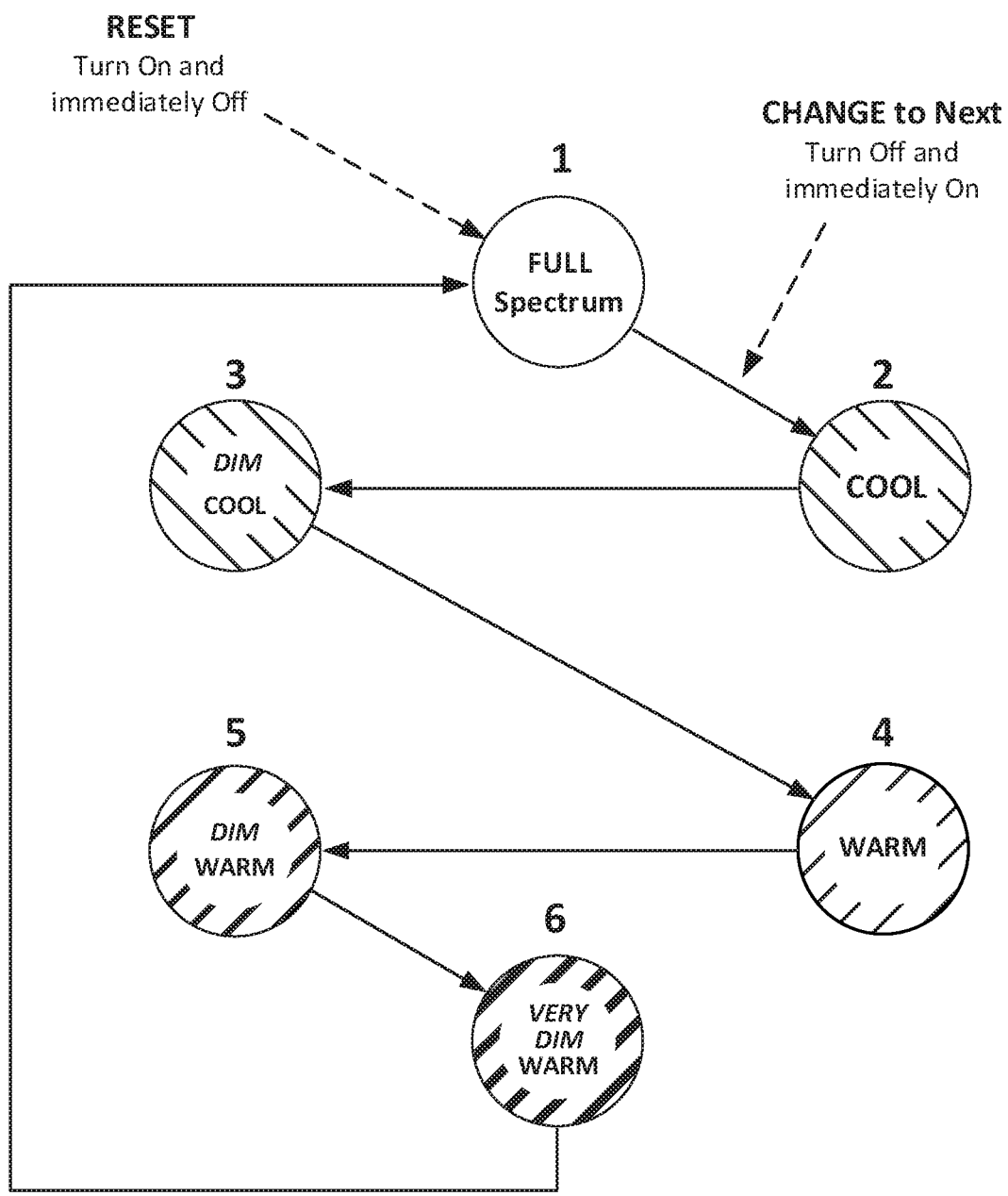
FIG. 10 shows a state diagram of microcontroller embodiment having six illumination states, further showing the transitions between those states.

Referring to FIG. 9, an electronic schematic of the microcontroller implementation is shown. Microcontroller 912 is of the popular Arduino series, used extensively in robotics and electronics projects. Devices with similar capabilities may be used. Bridge rectifier circuit 900 is fed by the power Line IN connections, which also connect to an AC to DC power supply which provides lower voltage DC power for both the microcontroller and the illumination elements. Separate supplies may be used as appropriate. DC voltage from the bridge rectifier is fed through two resistors to the input of Opto-Isolator 902. When power is applied, the internal LED of the opto-isolator is energized, also energizing the output transistor on pins 5 and 4 of the optoisolator. In the energized state the output transistor conducts, reducing the voltage on capacitor C1 of the Power off detection circuit 904. The Power Odd detect line is thus Low. This line is connected to analog input A2 of the Arduino. A digital input pin may also be used. Capacitor C1 smooths out any AC ripple, which might otherwise present a pulsing rather than a constant HIGH signal immediately when power is remove. The high voltage is provided through C1 being charged through the 6.8 k ohm pullup to 5v resistor attached to C1. Electrolytic capacitor 906 functions to provide short-lived electrical power to sustain operation of the Arduino and the Power off detect circuitry for enough time for effective operation. This means that the Power Off detect line will go High and the Arduino program will have sufficient time to detect that Power Off signal and process it appropriately before total power goes off everywhere.

For the implementation shown, the illumination elements are provided by an LED strip which has both Warm and Cool LED components which are individually selectable via a data stream to the strip. This data stream is provided by the signal line labeled "LED strip Data In", connected to Arduino digital output pin D7 as shown. The exact methods of turning on Warm LEDs and COOL LEDs are well known in the field, and any method of energizing cool, warm, or both types of elements may be used as alternatives.

Schematic section 908 is labeled "VPersist". The circuit provides a persistent voltage which gradually decays after power is turned off. Charging up of this voltage, stored on C2 is provided through diode D1 which is connected to Arduino Digital output pin D5. When the Arduino program energizes D5 to High, capacitor C2 quickly charges to its full voltage through the relatively low value 1.2 k resistor. Whenever power goes off, the voltage on C2 starts gradually decaying, via the larger resistor R2. R2 and C2 have a time constant RC on the order of 4 seconds. This Persist voltage level can be read at the appropriate time by the Arduino program via Arduino analog input pin A0, connected to C2 via a 120 k resistor.

Figure 11:
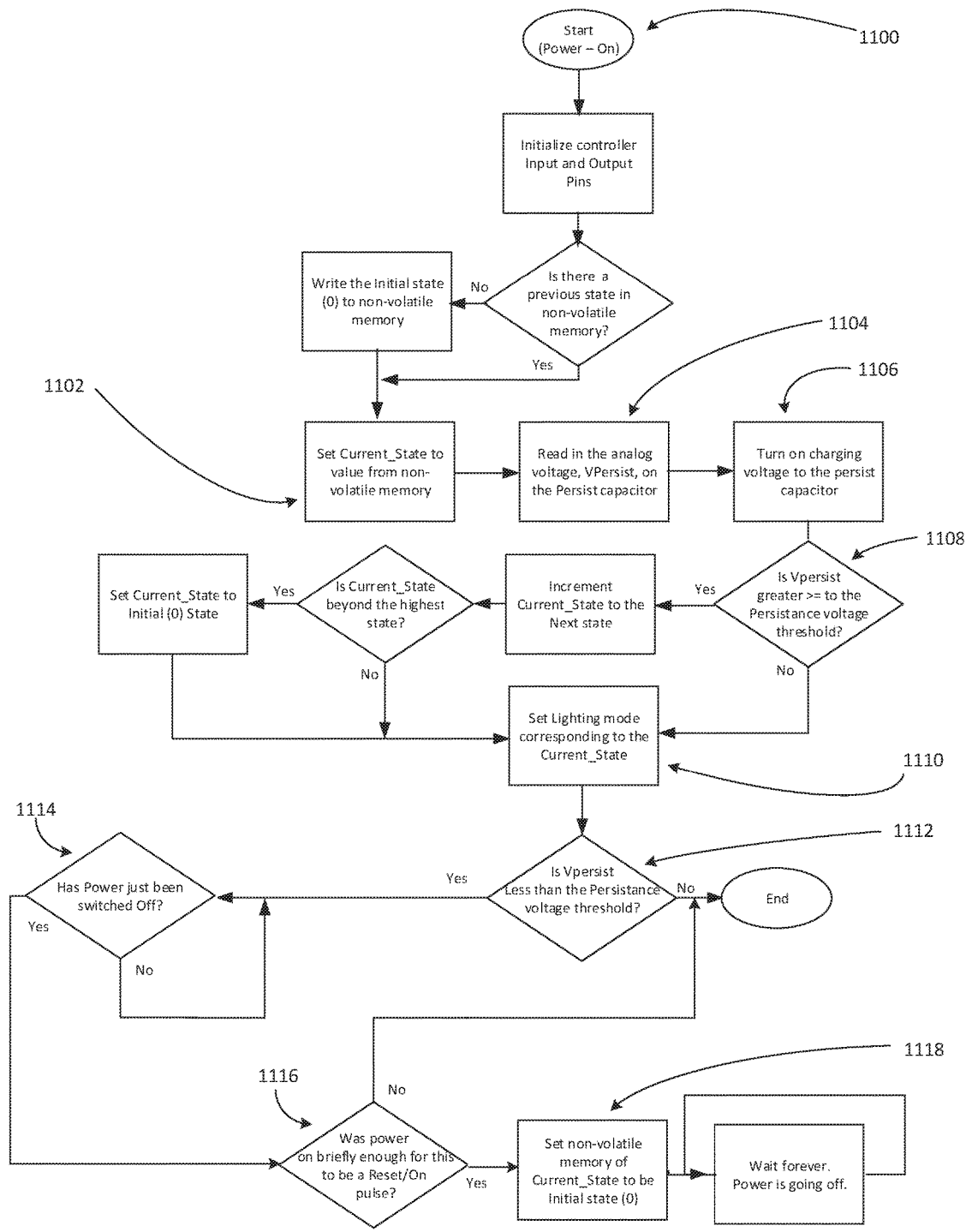
FIG. 11 shows a flowchart for the microcontroller embodiment.

Referring to FIG. 11, the flowchart of the Arduino program is shown. Though virtually all Arduino programs make use of both the "Setup" and "Loop" functions implemented by the programmer, this implementation makes use solely of the Setup function, for which FIG. 11 shows the flowchart. Setup programs are called once, immediately on Powering up of the controller. In this embodiment of the invention, the only subsequent event to be processed is the Power Off, which is handled differently and specifically for the invention. Immediately on the application of light bulb power, the Arduino program begins program execution at the flowchart Start node 1100. The input and output pins are specified and initialized and then the Arduino's internal, non-volatile memory is checked to see if a previous lighting state has been stored. If there was none, then the initial State 0 is chosen and immediately written to non-volatile memory as the previous state. In any case, program flow continues to function block 1102, whereby the previous state is read from non-volatile memory and store in variable "Current_State" to become the next and state of the lighting elements.

Control flow continues to function block 1104, whereby the decaying Persist voltage (see above) is read in and saved in the variable "VPersist". At this point, function block 1106 is entered which turns on charging up of the persist voltage, but not affecting Vpersist, which has just been measured and stored.

Control continues to conditional block 1108 whereby the saved VPersist is compared to be greater than or equal to a threshold. Being above this threshold is taken to mean that Power was only interrupted momentarily, and thus there is still voltage on the capacitor. If so, this is taken to be the signal to move to the next sequential lighting state. The Yes exit of conditional 1108 is then followed and the value of the Current State variable is incremented. If such incrementing goes beyond the last state, the initial "0" state is chosen for the next state, thus implementing a wraparound function.

In any case, regardless of which exit, Yes or No, of conditional block 1108 was followed, Function block 1110 is now entered. This energizes the lighting elements to match the current state.

Program flow now enters Conditional block 1112. This final section implements an "Everyone synchronize" function. If the VPersist value is less than the Persistence threshold, it signifies that we haven't just incremented the lighting state with a brief, momentary Off excursion, but rather the Off time has been relatively longer. In this case we can check for a brief On pulse followed by an Off transition. If Vpersist is, however, higher than the threshold, it signifies the previous Off period was of a very short duration. This does not qualify for the Reset sequence, which is Long Off—Short On—Turn Off. Therefore the No exit of conditional 112 is taken and the program halts. Brief Off has already been handled. The only option left is a simple turning Off, which requires no further processing.

When Long Off—Short On—Turn Off occur in sequence they together signify we should do a reset meaning all bulbs should synchronize so that their next lighting state is the first state. Program flows from the Yes exit of Conditional block 1112, which signifies a decayed VPersist voltage, indicative of a long Off period. Conditional Block 1114 is then entered, which checks for a Power Off signal. If there is not one, control flow simply loops, waiting for a Power Off to occur. When that Power Off is detected, control flow moves to Conditional block 1116, which checks to see that the On duration has been short enough to be part of a Reset. If not, the program similarly ends. If the On duration has been short enough, control flow moves to function block 1118, which immediately sets the non-volatile stored current state to be 0, the initial state. Subsequent to that the program simply goes into an infinite loop. This doesn't last long since Power has just been turned off. The program has simply caught it and already reset the current state to be the initial one. Thus when power is next turned on, perhaps long in the future, all bulbs will be synchronized as they in unison return to the initial state.

While particular embodiments of the invention have been shown, both in hardware and software, and described, it will be obvious to those skilled in the art that changes and modifications may be made without departing from the scope of the claimed invention.

What is claimed:

1. A light-emitting device comprising a plurality of individual light emitting sub-elements connected to electric power controlled by a switch, the light emitting device having three or more different lighting states, the lighting states being distinguishable visually from each other either on the basis of Color Temperature, between Warm, (below 3000 degrees Kelvin) and Cool, (above 4000 degrees Kelvin), or on the basis of Brightness or a combination thereof, the light-emitting device further comprising:
   a) a circuit configured to detect a sequence of one or more momentary fluctuations of power defining a First user control message,
   b) a circuit configured to detect a sequence of one or more momentary fluctuations of power, different from the sequence of the First user control message, defining a Second user control message, and
   c) a memory circuit configured to store a countable number of states, corresponding to that number of lighting states, the memory circuit providing retention of its memory state during periods of power off,
   wherein the First user control message comprises a sequence of a momentary fluctuation of power from the On state, to the Off state, and then back to the On state, and wherein the Second user control message comprises a second sequence of a momentary fluctuation of power from the Off state to the On state, and then back to the Off state.

2. The device of claim 1 wherein the light-emitting device is a lighting fixture, comprising an enclosure containing a plurality of light bulbs.

3. The device of claim 2 wherein the light-emitting device is a single light bulb.

4. The device of claim 3 wherein the First user control message effects a cycle of the memory circuit to the next sequential lighting state.

5. The device of claim 4 wherein the Second user control message effects a setting of the memory circuit to a unique state, effecting a reset, defining an Initial memory state not dependent on a current or previous memory state.

6. The device of claim 5 wherein the Brightness changes are implemented by selectively enabling or disabling different numbers of individual lighting sub-elements.

7. The device of claim 6 wherein the Brightness changes are implemented by Pulse Width Modulation, such that varied pulse width duty cycles simultaneously effect varied Brightness for multiple elements.

8. The device of claim 7 wherein the Brightness changes are implemented by modification of the current of a constant current source circuit such that various current values simultaneously effect varied Brightness for multiple elements.

9. The device of claim 8 wherein the Color Temperature changes are implemented by selectively enabling or disabling different numbers of individual lighting sub-elements, each sub-element chosen from a set of sub-elements having two or more different color temperatures.

10. The device of claim 9 wherein the Color Temperature changes are implemented by Pulse Width Modulation, such that one pulse width duty cycles is used to set the brightness of a first set of sub-elements having a first color temperature, and a second pulse width duty cycle is used to set the brightness of a second set of sub-elements, different from the first, having a second color temperature different from the first color temperature.

11. The device of claim 10 wherein the memory circuit is implemented using a non-volatile memory device.

12. The device of claim 10 wherein said memory circuit is implemented with volatile memory elements and memory is maintained during periods of power off by means of a power storage element.

13. The device of claim 10 wherein the power storage element is a battery.

14. The device of claim 13 wherein the battery is trickle charged during periods of power on state.

15. The device of claim 13 wherein the power storage element is a capacitor or super-capacitor configured to become fully charged during a power On state.

16. A light bulb containing a plurality of individual light emitting sub-elements connected to electric power controlled by an on/off switch, the light bulb having three or more different lighting states, the light bulb further comprising:

a) a circuit configured to detect a sequence of one or more momentary fluctuations of power from on to off and off to on, thereby defining a First user control message, said First user control message corresponding to a change in lighting state, said circuit further configured to implement that change in lighting state in response to detection of the First user control message; and b) a circuit configured to detect a sequence of one or more momentary fluctuations of power from on to off and off to on, different from the sequence of the First user control message, defining a Second user control message, said Second user control message corresponding to and defining a fixed Reset lighting state, and further configured to implement a change from a current lighting state, independent of the lighting state, to the fixed Reset lighting state; and c) a memory circuit configured to store the current lighting state, and a number corresponding to one of countable numbers of lighting states, the memory circuit providing retention of its memory, including the stored current lighting state, during periods of power off.

17. A method of providing multiple lighting state control to a room lighting system controlled via a single on/off switch, two switches (3-way control), or three or more switches ("4-way" control), comprising the steps of:

i) initially inserting or replacing existing light bulbs with the light bulbs of claim 16 into the room lighting system; and ii) controlling the light bulbs in the room lighting system, with said switch or switches using on/off lighting state control whereby each switch controls power to the light bulbs in its circuit with an on/off control.

* * * * *